(12) United States Patent
Arata

(10) Patent No.: US 7,278,609 B2
(45) Date of Patent: Oct. 9, 2007

(54) MOVABLE NOSE CAP AND CONTROL STRUT ASSEMBLY FOR SUPERSONIC AIRCRAFT

(75) Inventor: Allen A. Arata, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/198,498

(22) Filed: Aug. 5, 2005

(65) Prior Publication Data
US 2007/0029438 A1 Feb. 8, 2007

(51) Int. Cl.
B64C 1/38 (2006.01)
B64C 1/40 (2006.01)
B64C 1/52 (2006.01)
B64C 3/18 (2006.01)

(52) U.S. Cl. .............. 244/130; 244/1 A; 244/1 N; 244/171.7; 244/99.1; 244/3.21; 244/37

(58) Field of Classification Search ............. 244/1 N, 244/1 A, 3.21, 35 A, 37, 45 A, 99.1, 171.7, 244/171.8, 121, 130, 204, 204.1, 206
See application file for complete search history.

(56) References Cited

U.S. PATENT DOCUMENTS

| | | | |
|---|---|---|---|
| 3,425,650 A * | 2/1969 | Silva | 244/130 |
| 4,650,139 A * | 3/1987 | Taylor et al. | 244/172.4 |
| 4,786,009 A | 11/1988 | Rao et al. | |
| 4,790,499 A | 12/1988 | Taylor et al. | |
| 4,898,342 A | 2/1990 | Kranz et al. | |
| 5,050,819 A | 9/1991 | Moskovitz | |
| 5,083,724 A * | 1/1992 | Kranz | 244/3.21 |
| 5,201,829 A * | 4/1993 | Peters, Jr. | 244/99.1 |
| 5,207,397 A * | 5/1993 | Ng et al. | 244/45 A |
| 5,449,131 A | 9/1995 | Kramer | |
| 6,161,802 A | 12/2000 | Cunningham, Jr. | |
| 6,698,684 B1 * | 3/2004 | Henne et al. | 244/1 N |

FOREIGN PATENT DOCUMENTS

WO WO92/01602 2/1992

* cited by examiner

Primary Examiner—Teri Pham Luu
Assistant Examiner—Joshua Michener
(74) Attorney, Agent, or Firm—Alan G. Towner, Esq.; Pietragallo Bosick & Gordon, LLP

(57) ABSTRACT

A nose cap and control strut assembly for supersonic aircraft is disclosed. In one embodiment, the nose cap extends forward from the nose of the aircraft to deflect shock waves and decrease draft during supersonic flight. In another embodiment, control struts extending from the nose of the aircraft have control surfaces which provide yaw and pitch control for the aircraft. The control struts may be rotatable around axes substantially parallel with the longitudinal axis of the aircraft. The control struts may also be retractable into the aircraft. The nose cap may be mounted at the forward ends of the control struts in such a manner that the nose cap remains in a stationary position with respect to the aircraft when the control struts are rotated.

21 Claims, 5 Drawing Sheets

MOVABLE NOSE CAP AND CONTROL STRUT ASSEMBLY FOR SUPERSONIC AIRCRAFT

FIELD OF THE INVENTION

The present invention relates to supersonic aircraft, and more particularly relates to extendable and/or rotatable nose cap and control strut assemblies for supersonic aircraft.

BACKGROUND INFORMATION

Supersonic and hypersonic aircraft tend to have low leading edge sweeps. Such low leading edge sweeps are beneficial for supersonic and hypersonic flight, but they can generate unwanted supersonic drag. An approach to reduce such drag would be to add a cap extending from the nose of the aircraft which deflects supersonic bow shock waves away from the aircraft. It would also be desirable to provide control struts for such an extended nose cap including control surfaces which can provide yaw and pitch control for the aircraft.

SUMMARY OF THE INVENTION

An embodiment of the present invention provides a nose cap for supersonic aircraft which extends forward from the nose of the aircraft to deflect shock waves and decrease drag during supersonic flight. Another embodiment of the invention provides control struts extending from the nose of the aircraft having control surfaces which may provide yaw and pitch control for the aircraft. The control struts may be rotatable around axes substantially parallel with the longitudinal axis of the aircraft. The control struts may also be retractable into the aircraft. The nose cap may be mounted at the forward ends of the control struts in such a manner that the nose cap remains in a stationary position with respect to the aircraft when the control struts are rotated.

An aspect of the present invention is to provide an aircraft nose cap and control strut assembly comprising at least one rotatable control strut extending from a nose of the aircraft, and a nose cap mounted at a forward end of the rotatable control strut(s).

Another aspect of the present invention is to provide an aircraft nose cap and control strut assembly comprising at least one contoured control strut including a control surface extendable from a nose of the aircraft, and a nose cap mounted at a forward end of the contoured control strut(s).

A further aspect of the present invention is to provide an aircraft nose cap and control strut assembly comprising at least one contoured control strut including a control surface extendable from a nose of the aircraft and rotatable around an axis substantially parallel with a longitudinal axis of the aircraft, and a nose cap mounted at a forward end of the control strut(s).

These and other aspects of the present invention will be more apparent from the following description.

DETAILED DESCRIPTION

Figure 1:
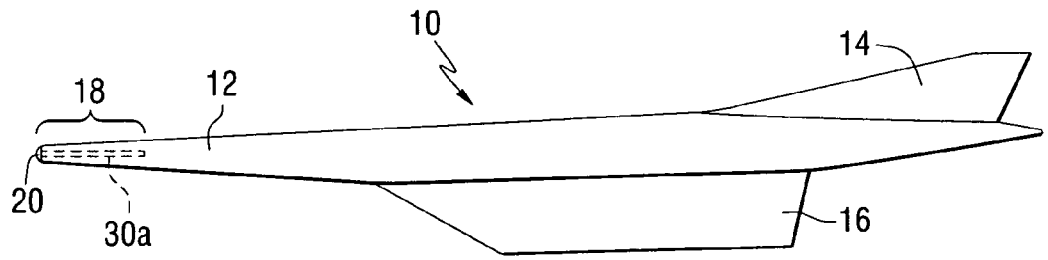
FIG. 1 is a partially schematic side view of a supersonic aircraft including a movable nose cap and control strut assembly in a stowed position in accordance with an embodiment of the present invention.
Figure 2:
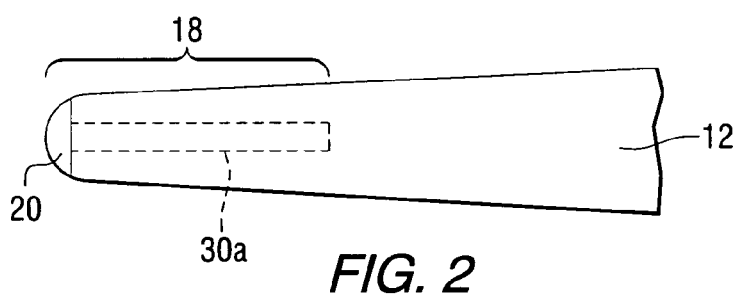
FIG. 2 is an enlargement of the nose portion of the supersonic aircraft shown in FIG. 1.
Figure 3:
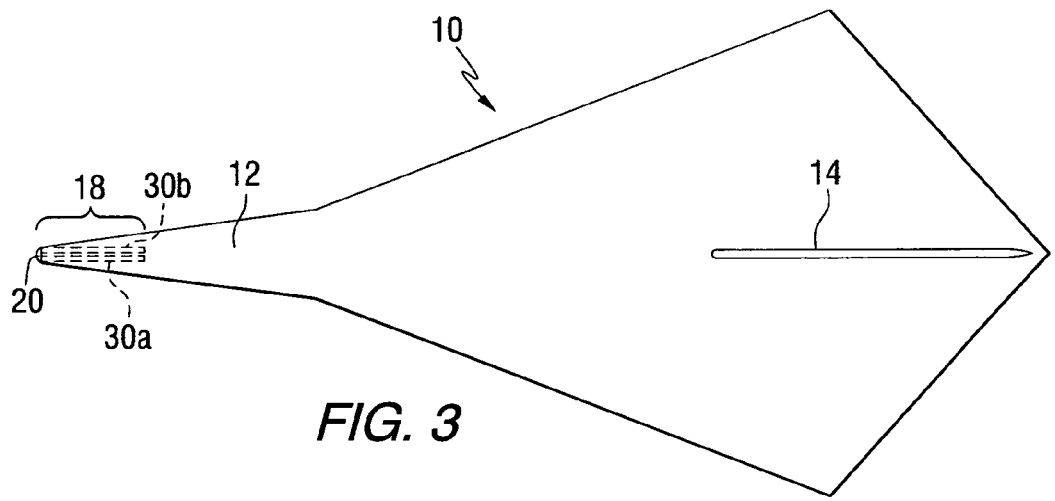
FIG. 3 is a partially schematic top view of the supersonic aircraft of FIG. 1, illustrating the movable nose cap and control strut assembly in the stowed position.
Figure 4:
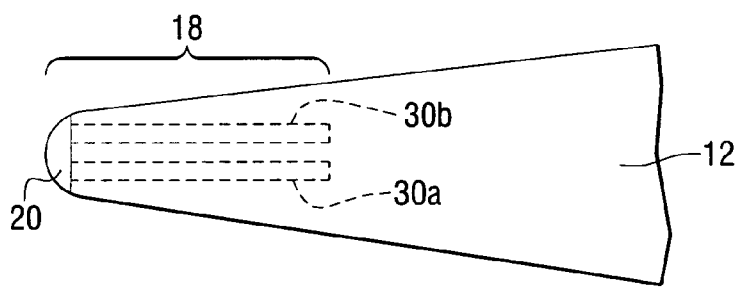
FIG. 4 is an enlargement of the nose portion of the supersonic aircraft shown in FIG. 3.
Figure 5:
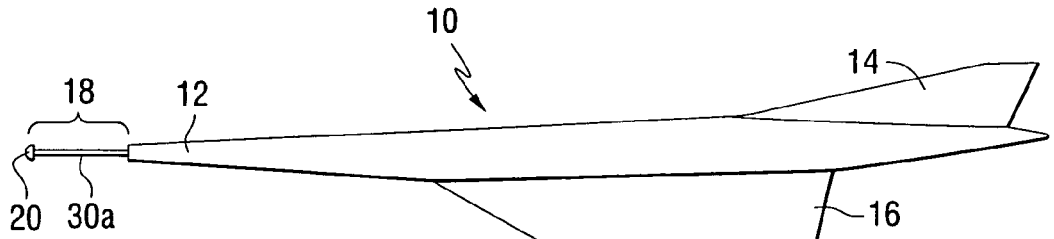
FIG. 5 is a partially schematic side view of the supersonic aircraft shown in FIGS. 1 and 3, illustrating the movable nose cap and control strut assembly in an extended or deployed position.
Figure 6:
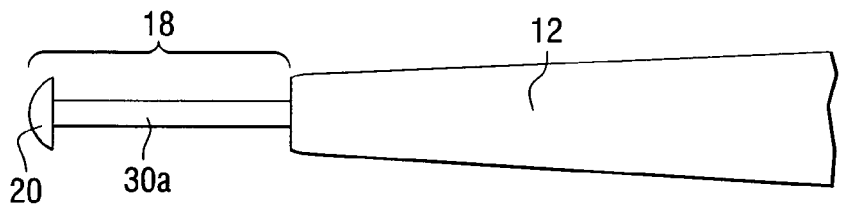
FIG. 6 is an enlargement of the nose portion of the supersonic aircraft shown in FIG. 5.
Figure 7:
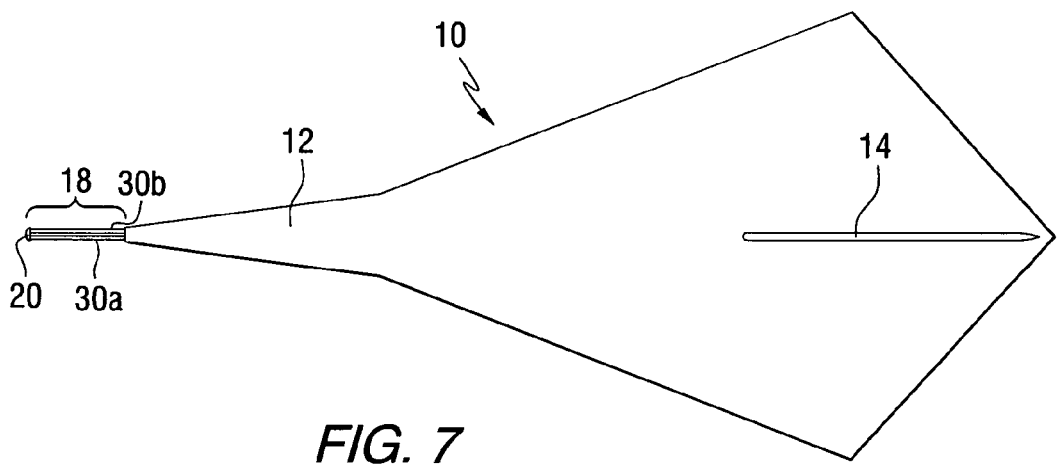
FIG. 7 is a partially schematic top view of the supersonic aircraft of FIG. 5, illustrating the movable nose cap and control strut assembly in the extended position.
Figure 8:
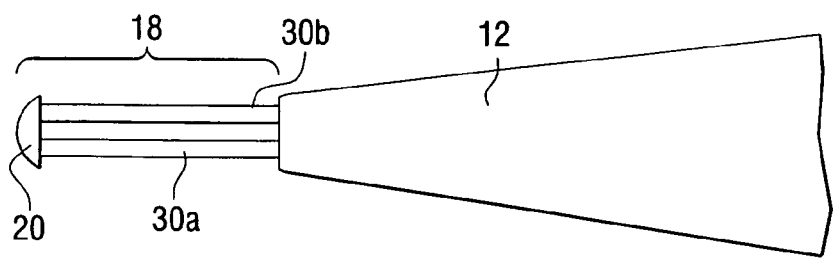
FIG. 8 is an enlargement of the nose portion of the supersonic aircraft shown in FIG. 7.

FIGS. 1-8 illustrate a supersonic aircraft 10 including a nose portion 12, tail 14 and engines 16. The supersonic aircraft 10 includes a movable nose cap and control strut assembly 18 in accordance with an embodiment of the present invention. The movable nose cap and control strut assembly 18 includes a nose cap 20 and control struts 30a and 30b.

In FIGS. 1-4, the nose cap 20 and control struts 30a and 30b are in a stowed or retracted position in which the control struts 30a and 30b are retracted into the nose 12 and the nose cap 20 is seated against the nose 12. In FIGS. 5-8, the nose cap 20 and control struts 30a and 30b are extended to a deployed position extending from the nose 12 of the aircraft 10. In the embodiment shown in FIGS. 1-8, two control struts 30a and 30b are attached to the nose cap 20. Alternatively, any other suitable number of control struts may be used.

The nose cap 20 may have any desired shape which helps reduce supersonic drag. In the embodiment shown in the present figures, the nose cap 20 has a generally hemispherical shape. However, any other suitable shape may be used, preferably blunt nosed or other shapes which help reduce drag of the aircraft during supersonic flight.

The controls struts 30a and 30b are each rotatable around an axis that is substantially parallel with a longitudinal axis of the aircraft 10. Each control strut 30a and 30b may rotate from about 1 to 360 degrees around its axis. For example, each control strut 30a and 30b may rotate from about 5 to about 180 degrees. In a particular embodiment, the control struts 30a and 30b rotate about 90 degrees.

In accordance with an embodiment of the present invention, in its extended position, the nose cap 20 does not rotate in relation to the nose 12 of the aircraft 10. Thus, when the control struts 30a and 30b rotate, the nose cap 20 remains stationary. This may be accomplished by providing any suitable type of rotatable coupling between the nose cap 20 and each of the control struts 30a and 30b.

The nose cap 20 mounted at the forward ends of the control struts 30a and 30b may be extendable any desired distance away from the nose 12 of the aircraft 10. For example, the nose cap 20 may be extended a distance of least about 10 cm. In one embodiment, the nose cap 20 may be extendable a distance of at least about 1 m from the nose 12 of the aircraft 10. Any suitable mechanism may be used to extend and rotate the control struts. For example, a conventional flap screwjack with extending rails (not shown) may be used to guide the control struts 30a and 30b. In the embodiment shown in FIGS. 1-8, the control struts 30a and 30b are retractable into the nose 12 of the aircraft 10. However, for some aircraft, it may be desirable to provide control struts which are permanently extended from the aircraft, or which only partially retract into the nose 12 of the aircraft 10.

Figure 10:
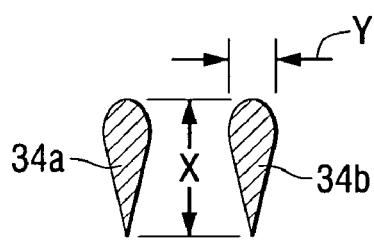
FIG. 10 is a cross sectional view of the control struts taken through section A-A of FIG. 9.
Figure 11:
FIG. 11 is a cross sectional view of the control struts taken through section B-B of FIG. 9.

In accordance with an embodiment of the present invention, the control strut(s) may include control surfaces which may be used to provide yaw and pitch control for the aircraft 10, for example, in the subsonic flight regime of the aircraft. FIGS. 9-14 illustrate an embodiment in which control struts 32a and 32b include control surfaces 34a and 34b. FIG. 10 is a cross section taken through section A-A of FIG. 9 corresponding to the elongated control surface sections 34a and 34b of the control struts. As shown in FIG. 10, the control surface sections 34a and 34b are non-circular and have elongated cross sections. For example, the control surface cross sections 34a and 34b may have aspect ratios X:Y of greater than about 2:1, for example, greater than about 3:1. FIG. 11 is a cross sectional view of the control struts 32a and 32b taken through section B-B of FIG. 9. At this location, the control struts 32a and 32b have substantially circular cross sections.

Figure 9:
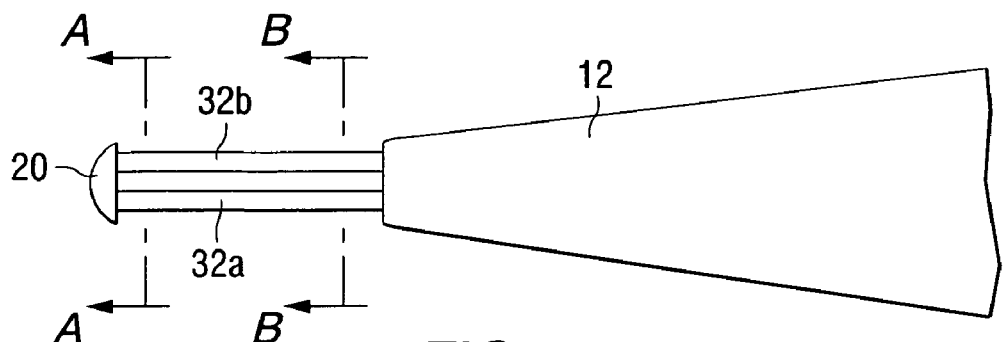
FIG. 9 is a partially schematic top view of the nose portion of a supersonic aircraft including an extended nose cap and control strut assembly in accordance with an embodiment of the present invention.
Figure 12:
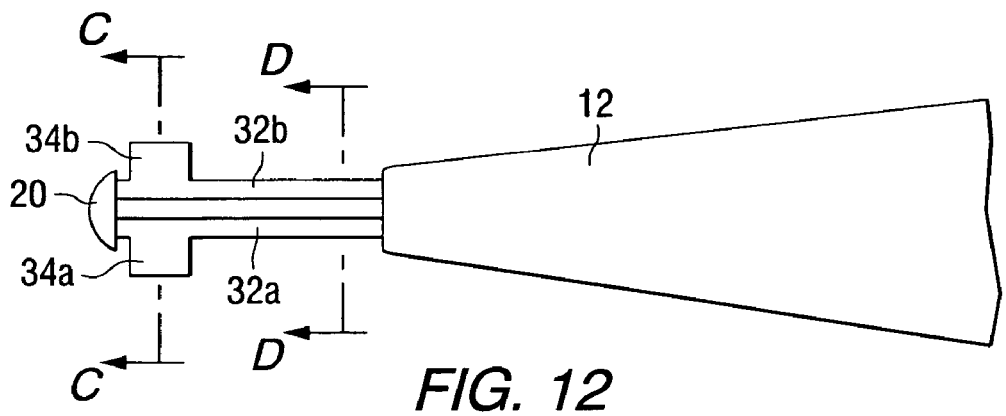
FIG. 12 is a partially schematic top view of the nose portion of the supersonic aircraft of FIG. 9, with the control struts rotated 90 degrees from their positions shown in FIG. 9.
Figure 13:
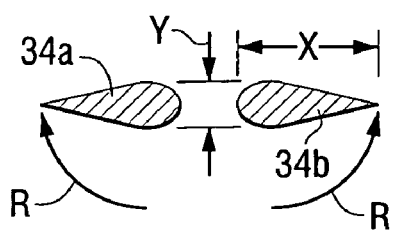
FIG. 13 is a cross sectional view of the control struts taken through section A-A of FIG. 12.
Figure 14:
FIG. 14 is a cross sectional view of the control struts taken through section B-B of FIG. 12.

The top view of the supersonic aircraft nose 12 illustrated in FIG. 12 shows rotations of the control struts 32a and 32b 90 degrees from their positions shown in FIG. 9. In the position shown in FIG. 12, the control surfaces 34a and 34b extend laterally. This is further illustrated in the cross sectional view of FIG. 13, taken through section C-C of FIG. 12. Comparing the orientation of the control surface sections 34a and 34b shown in FIG. 13 with those shown in FIG. 10, it can be seen that each control strut has been rotated 90 degrees around its axis. FIG. 14 is a cross section taken through section D-D of FIG. 12, further illustrating the circular cross sections of the control struts 32a and 32b near the aircraft nose 12.

FIGS. 9-14 thus illustrate an embodiment of the control strut assembly which may be used for trimmed/controlled flight of the aircraft. The rotated control struts expose a sharp edged paddle near the front of the assembly exposed to the up-wash in front of the aircraft. This may be desirable because a sharp edge low aspect surface will provide aerodynamic control for a relatively small surface. The amount of yaw and pitch control is controlled by the amount of rotation of the control struts around their axes parallel to the centerline of the aircraft.

Figure 15:
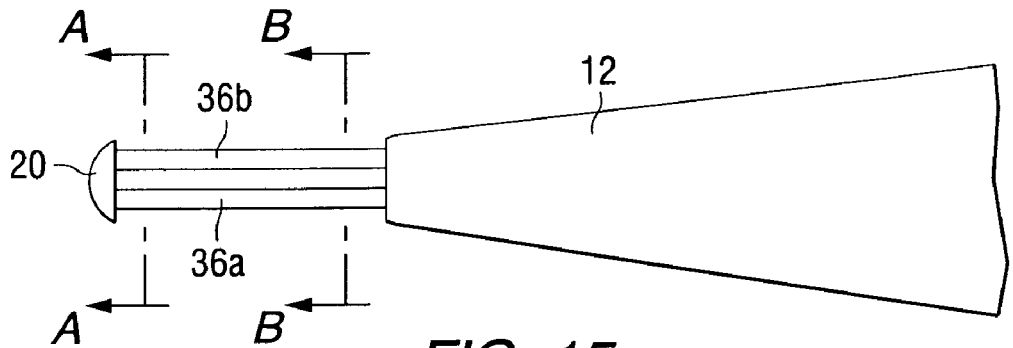
FIG. 15 is a partially schematic top view of the nose portion of a supersonic aircraft including an extended nose cap and control strut assembly in accordance with another embodiment of the present invention.
Figure 16:
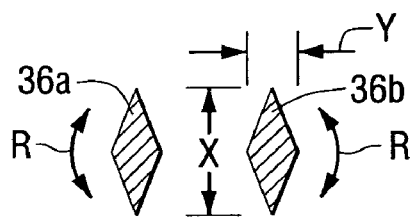
FIG. 16 is a cross sectional view of the control struts taken through section A-A of FIG. 15.
Figure 17:
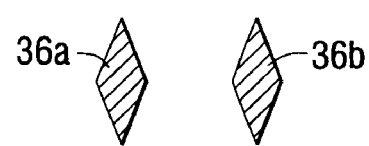
FIG. 17 is a cross sectional view of the control struts taken through section B-B of FIG. 15.

FIGS. 15-20 illustrate an extended nose cap and control strut assembly in accordance with another embodiment of the present invention. In this embodiment, the control struts 36a and 36b have elongated control surfaces extending along their entire lengths. FIG. 16 is a cross sectional view of the control struts 36a and 36b taken through section A-A of FIG. 15, while FIG. 17 is a cross sectional view of the control struts 36a and 36b taken through section B-B of FIG. 15. The control struts 36a and 36b maintain substantially the same elongated control surface cross sections having the aspect ratio X:Y along their lengths.

Figure 18:
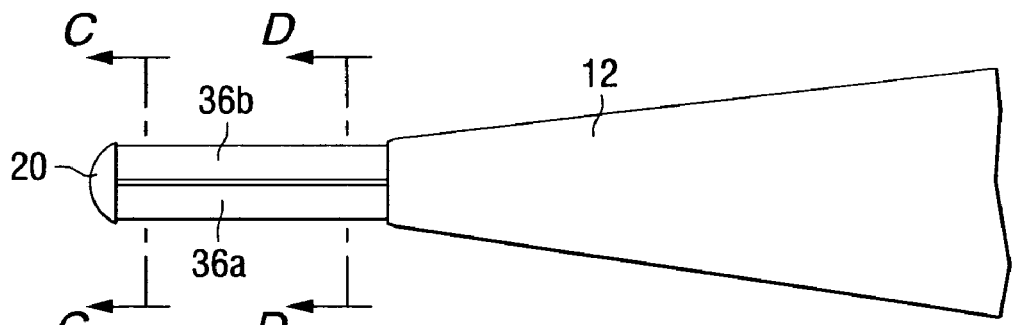
FIG. 18 is a partially schematic top view of a portion of the supersonic aircraft of FIG. 15, with the control struts rotated 90 degrees from their positions shown in FIG. 15.
Figure 19:
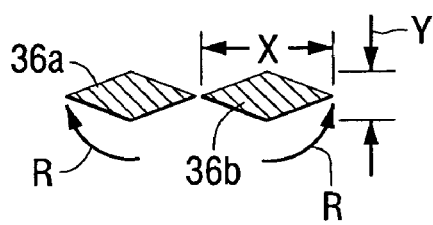
FIG. 19 is a cross sectional view of the control struts taken through section C-C of FIG. 18.
Figure 20:
FIG. 20 is a cross sectional view of the control struts taken through section D-D of FIG. 18.

In FIGS. 18-20, the control struts 36a and 36b have been rotated 90 degrees from their positions shown in FIGS. 15-17. The 90 degree rotation R of the control struts 36a and 36b provides a substantially horizontal control surface at the nose of the aircraft 12 which can provide yaw and pitch control for the aircraft.

FIGS. 15-20 thus illustrate another embodiment of the control strut assembly which may be used for trimmed/controlled flight of the aircraft. The rotated control struts expose their sharp edges to the upwash in front of the aircraft to provide aerodynamic control.

Figure 21:
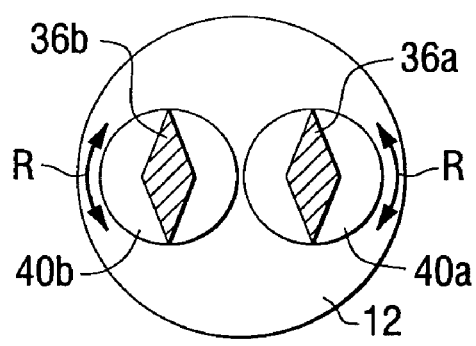
FIG. 21 is a front view of the nose of the supersonic aircraft of FIG. 15, illustrating the connection of the control struts to the aircraft nose by rotatable turntables.
Figure 22:
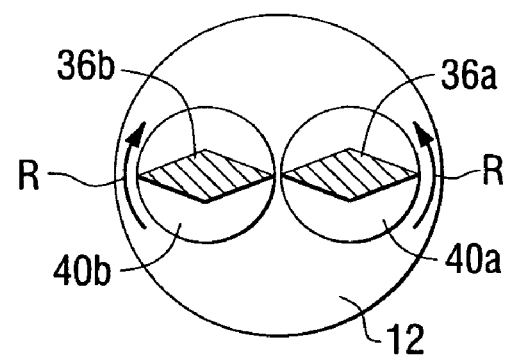
FIG. 22 is a front view of the nose of the supersonic aircraft of FIG. 18, illustrating a 90 degree rotation of each control strut and corresponding turntable in comparison with the control strut and turntable orientations shown in FIG. 21.

FIGS. 21 and 22 illustrate details of the rotational connection between the control struts 36a and 36b and the nose 12 of the aircraft. The control strut 36b is mounted on a turntable 40b which rotates in the direction R with respect to the nose 12. Similarly, the control strut 36a is mounted on a turntable 40a which is rotatable in the direction R with respect to the nose 12. The turntables 40a and 40b are preferably flush with the surface of the nose 12, and may be sealed against the surface of the nose 12, in order to substantially prevent airflow between the inside and outside of the aircraft skin. In FIG. 22, the control struts 36a and 36b, and their respective turntables 40a and 40b, are rotated 90 degrees with respect to their positions shown in FIG. 21.

Whereas particular embodiments of this invention have been described above for purposes of illustration, it will be evident to those skilled in the art that numerous variations of the details of the present invention may be made without departing from the invention as defined in the appended claims.

The invention claimed is:

1. An aircraft nose cap and control strut assembly comprising:
    at least two rotatable control struts including control surfaces extending from a nose of the aircraft; and
    a nose cap mounted at a forward end of the at least two rotatable control struts wherein the control struts are rotatable around different axes which are substantially parallel with each other and the nose cap is coupled to the control struts such that rotation of the control struts does not result in rotation of the nose cap.

2. The assembly of claim 1, wherein the at least two control struts are rotatable around axes substantially parallel with a longitudinal axis of the aircraft.

3. The assembly of claim 2, wherein the at least two control struts are rotatable less than 360 degrees around their axes.

4. The assembly of claim 1, wherein the at least two control struts have non-circular cross sections extending through their control surfaces.

5. The assembly of claim 1, wherein the at least two control struts have elongated cross sections extending through their control surfaces having an aspect ratio of greater than about 2:1.

6. The assembly of claim 1, wherein the at least two control struts are retractable toward the aircraft.

7. The assembly of claim 1, wherein the at least two control struts are retractable into the nose of the aircraft.

8. The assembly of claim 1, wherein the nose cap is substantially hemispherical.

9. The assembly of claim 1, wherein the aircraft is a supersonic aircraft.

10. An aircraft nose cap and control strut assembly comprising:
    at least two rotatable contoured control struts including control surfaces extendable from a nose of the aircraft; and a nose cap mounted at a forward end of the at least two extendable control struts, wherein the nose cap is coupled to the control struts such that rotation of the control struts does not result in rotation of the nose cap.

11. The assembly of claim 10, wherein the nose cap is extendable in a direction substantially parallel with a longitudinal axis of the aircraft.

12. The assembly of claim 11, wherein the nose cap is extendable a distance of at least about 10 cm from the nose of the aircraft.

13. The assembly of claim 11, wherein the nose cap is extendable a distance of at least about 1 m from the nose of the aircraft.

14. The assembly of claim 10, wherein the nose cap is substantially hemispherical.

15. The assembly of claim 10, wherein the control struts are rotatable around axes substantially parallel with a longitudinal axis of the aircraft.

16. The assembly of claim 10, wherein the control struts have non-circular cross sections extending through their control surfaces.

17. The assembly of claim 10, wherein the control struts have elongated cross sections extending through their control surfaces having an aspect ration of greater than about 2:1.

18. The assembly of claim 10, wherein the control struts are retractable into the nose of the aircraft.

19. The assembly of claim 10, wherein the control struts are rotatable around axes which are substantially parallel with each other.

20. The assembly of claim 19, wherein the axes are substantially parallel with a longitudinal axis of the aircraft.

21. The assembly of claim 10, wherein the aircraft is a supersonic aircraft.

* * * * *